US007587719B2

(12) United States Patent
Palecek et al.

(10) Patent No.: US 7,587,719 B2
(45) Date of Patent: Sep. 8, 2009

(54) METHOD AND APPARATUS FOR COMBINING EXTENDED MARKUP LANGUAGE AND KEY/VALUE PAIRS INTO THE FORMAT OF AN INTERPROCESS MESSAGE PAYLOAD

(75) Inventors: Lowell D. Palecek, White Bear Township, MN (US); Daryl J. Kress, Hugo, MN (US)

(73) Assignee: Unisys Corporation, Blue Bell, PA (US)

( * ) Notice: Subject to any disclaimer, the term of this patent is extended or adjusted under 35 U.S.C. 154(b) by 742 days.

(21) Appl. No.: 10/848,902

(22) Filed: May 19, 2004

(65) Prior Publication Data

US 2005/0259680 A1      Nov. 24, 2005

(51) Int. Cl.
*G06F 13/00* (2006.01)
(52) U.S. Cl. .................. 719/313; 719/316; 707/102
(58) Field of Classification Search ................. 719/313, 719/316; 707/102
See application file for complete search history.

(56) References Cited

U.S. PATENT DOCUMENTS

| 6,970,869 | B1 * | 11/2005 | Slaughter et al. | 707/10 |
| 7,032,011 | B2 * | 4/2006 | Woodard et al. | 709/220 |
| 2005/0203939 | A1 * | 9/2005 | Kartzmark et al. | 707/102 |
| 2007/0208758 | A1 * | 9/2007 | Yeap et al. | 707/100 |

* cited by examiner

*Primary Examiner*—Andy Ho
(74) *Attorney, Agent, or Firm*—James E. Goepel; Nawrocki, Rooney & Sivertson, PA

(57) ABSTRACT

An apparatus for and method of utilizing an existing predefined messaging protocol to convey additional data in application-to-application communication. Instead of utilizing a plurality of the existing predefined messages or defining a new unique message type to convey the needed data, a single preexisting message type is used to define location and format of the data objects to be communicated. The receiving application unpacks these definitions from the single message received and accesses the defined data objects as required.

21 Claims, 12 Drawing Sheets

| | |
|---|---|
| InitDocument | Initially allocates a buffer of a given size for m_bstrDocument, but sets the length to zero. |
| AttachDocument | Attaches a BSTR to the CDACSMessage object as the header. |
| CopyInDocument | Copies a provided BSTR to m_bstrDocument. Similar to operator = for CComBSTR. |
| AppendDocument | Appends a BSTR to m_bstrDocument. |
| DetachDocument | Detaches m_bstrDocument from the CDACSMessage object. |
| GetDocument | Returns m_bstrDocument. Similar to operator BSTR for CComBSR. |
| CopyOutDocument | Returns a copy of m_bstrDocument. |
| HasDocument | Returns TRUE if length of m_bstrDocument is not zero. Compare to operator ! for CComBSTR. |
| GetDocumentLength | Returns the length in characters of m_bstrDocument. |
| ReserveDocumentSpace | Allocates space for the document buffer. Makes multiple AppendDocument calls more efficient. |
| SetDocumentLength | Sets the length in characters of m_bstrDocument. |
| EmptyDocument | Frees m_bstrDocument. |

FIG. 9

| | |
|---|---|
| AttachToIterator | Initializes the given CDACSMsgPropIterator object to access the property map of this. |
| GetProperty | Gets a copy of the property value. Overloaded for integer, bool, CComBSTR, or CComVariant. |
| SetProperty | Sets the property value to a copy of the input. |
| SetPropertyCount | Returns the number of properties. |
| HasProperties | True if the message has at least one property. |
| ClearProperties | Deletes all the properties. |
| CopyOutDocument | Returns a copy of m_bstrDocument. |

FIG. 10

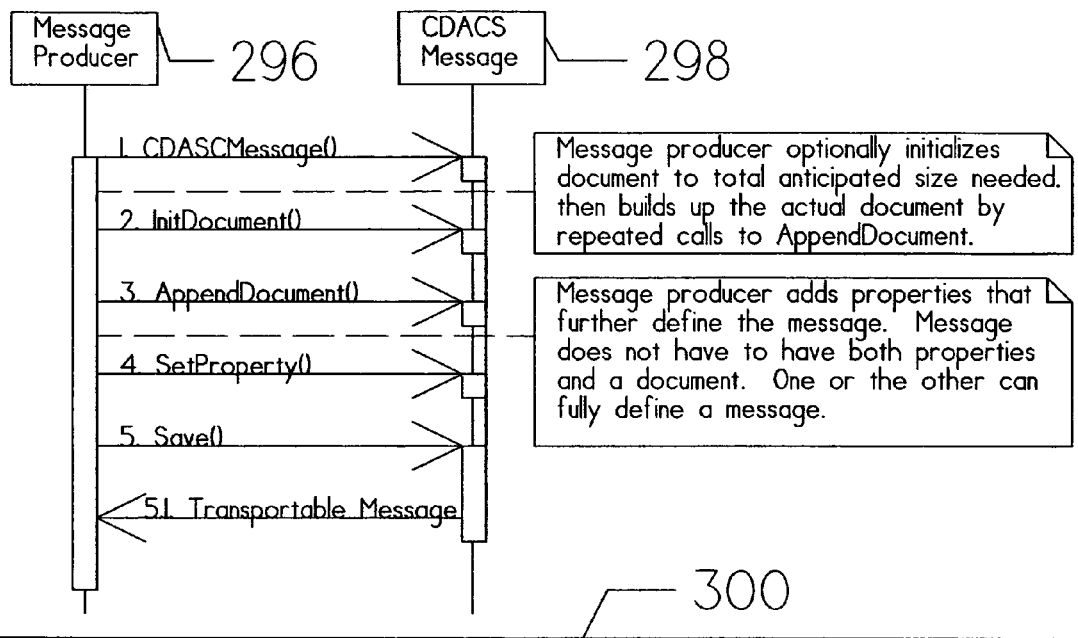

FIG. 11

| Message # | Description |
|---|---|
| 1 | Constructs the message object. Property list and document initialy empty. Message Type and ID constructed as in declaration. |
| 2 | Reserve space for the document, with the initial length set to zero. |
| 3 | Add a character string to the document. Repeat until done. |
| 4 | Add a property to the message. Repeat until done. |
| 5 | Package the entire message object into a single BSTR, wrapped in the caller's CComVariant parameter. |
| 5.1 | The transportable data is attached to the caller's CComVariant parameter. |

METHOD AND APPARATUS FOR COMBINING EXTENDED MARKUP LANGUAGE AND KEY/VALUE PAIRS INTO THE FORMAT OF AN INTERPROCESS MESSAGE PAYLOAD

CROSS REFERENCE TO CO-PENDING APPLICATIONS

U.S. patent application Ser. No. 10/848,473, filed May 19, 2004, and entitled, "Interface Cool ICE OLEDB Consumer Interface"; U.S. patent application Ser. No. 09/188,629, filed Nov. 9, 1998, and entitled, "Cool ICE data Wizard", now U.S. Pat. No. 6,295,531; U.S. patent application Ser. No. 09/188,649, filed Nov. 9, 1998, and entitled, "Cool ICE Column Profiling"; U.S. patent application Ser. No. 10/849,511, filed May 19, 2004, and entitled, "Stored Procedure"; and U.S. patent application Ser. No. 09/188,725, filed Nov. 9, 1998, and entitled, "Cool ICE State Management", now U.S. Pat. No. 6,324,639, are commonly assigned co-pending applications.

BACKGROUND OF THE INVENTION

1. Field of the Invention

The present invention generally relates to diverse data base management systems and more particularly relates to enhanced message handling techniques which provide efficient communication between such diverse data base management systems.

2. Description of the Prior Art

Data base management systems are well known in the data processing art. Such commercial systems have been in general use for more than 20 years. One of the most successful data base management systems is available from Unisys Corporation and is called the Classic MAPPER® data base management system. The Classic MAPPER system can be reviewed using the Classic MAPPER User's Guide which may be obtained from Unisys Corporation.

The Classic MAPPER system, which runs on proprietary hardware also available from Unisys Corporation, provides a way for clients to partition data bases into structures called filing cabinets and drawers, as a way to offer a more tangible format. The Mapper data base manager utilizes various predefined high-level instructions whereby the data base user may manipulate the data base to generate human-readable data presentations called "reports". The user is permitted to prepare lists of the various predefined high-level instructions into data base manager programs called "Mapper Script". Thus, users of the Classic MAPPER system may create, modify, and add to a given data base and also generate periodic and aperiodic reports using various Mapper Script.

However, with the Classic MAPPER system, as well as with similar proprietary data base management systems, the user must interface with the data base using a terminal coupled directly to the proprietary system and must access and manipulate the data using the Mapper Script command language of Classic MAPPER. Ordinarily, that means that the user must either be co-located with the hardware which hosts the data base management system or must be coupled to that hardware through dedicated telephone, satellite, or other data links. Furthermore, the user usually needs to be schooled in the command language of Classic MAPPER (or other proprietary data base management system) to be capable of generating Mapper Script.

However, some of the most powerful data base management functions or services of necessity rely on coupling data from one legacy data base to another. This tends to be difficult because of the incompatibilities between differing legacy data base systems Further problems arise with legacy data base management system access to various incompatible data bases as well. To be most useful, there must be the capability to access such preexisting, incompatible data bases. Unfortunately, this involves a number of incompatible message types. This promotes substantial inefficiencies in processing service requests and providing corresponding responses.

SUMMARY OF THE INVENTION

The present invention overcomes the disadvantages of the prior art by providing a method of and apparatus for simplifying message format and traffic between legacy data base management systems. This enhanced message protocol permits the user to log-on, insert, update, delete, fetch, and log-off from a previously incompatible data base interface. In accordance with the present invention, a user is permitted to easily operate on data within an existing data base which is otherwise incompatible with the preferred legacy data base management system, BIS.

The preferred mode of the present invention provides a generic messaging protocol that can be used by client/server applications. The properties can be transmitted in different data types such as integer, boolean, BSTR, and VARIANT. The message object also provides the capability to transmit XML, as either a document included in the message, or as XML contained in individual properties. An object API (Applications Programming Interface) is provided to set and retrieve message properties and document information.

The object API also provides the capability for the message to render itself into a byte stream for transmission across a communications protocol, as well as the ability to reconstitute state from a byte stream received.

The protocol consists of two primary classes used by the consumer application: the CDACSMesage class and the CDACSMsgPropIterator class. The CDACSMessage class provides the primary interface to the message processing with the ability to construct, set and get attributes, or read/write out message content. The CDACSMsgPropIterator class provides an iterator object interface to move through a sequence of properties in the message, so that the keys and value of message properties can be accessed.

The message body is a set of CComVariant properties, and a CComBSTR buffer. The CDACSMessage class provides methods for the consumer to mange the properties and document buffer.

A BSTR is a pointer to a buffer of Unicode characters. The length of the buffer is offset four bytes before the characters begin. The entire buffer is null-terminated, but there can also be null characters embedded in the buffer. The length of the BSTR is one less than the number of characters in the buffer (the buffer includes a final null character), not the length to the first null, in reality, a Unicode "character" is type defined as an unsigned short integer, so a BSTR can point to generic binary information as well as text.

A BSTR can be utilized as though it were a simple pointer to WCHAR, except for finding length or managing the attached buffer to which it points. For memory management, the Windows libraries provide "system" procedures (SysAllocString, SysFreeString, SysStringLen, etc.), which are packaged conveniently into the CComBSTR class methods.

To the CDACSMessage consumer, the properties and the attached document buffer constitute the message data. A message need not have both properties and document. It can consist entirely of properties with no document, or have no properties and consist solely of the attached document.

Properties are indexed by unique integer keys. The consumers define meaning of these keys and the associated CComVariant values. As noted above, the contents of the document can be non-textual binary data.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 9 is a table showing the methods for managing the message body;

FIG. 10 is a table showing the method of managing the property list in the CDACSMessage class;

FIG. 11 is a detailed sequence diagram showing use of the objects to build up the message by a message producer.

DETAILED DESCRIPTION OF THE PREFERRED EMBODIMENTS

The present invention is described in accordance with several preferred embodiments which are to be viewed as illustrative without being limiting. These several preferred embodiments are based upon Series 2200 hardware and operating systems, the Classic MAPPER data base management system, and the BIS software components, all available from Unisys Corporation. When used herein, OLEDB refers to a COM-based Application Programming Interface (API) designed to provide access to a wide range of data sources. OLEDB includes SQL functionality but also defines interfaces suitable for gaining access to data other than SQL data. COM facilitates application integration by defining a set of standard interfaces. Each interface contains a set of functions that define a contract between the object implementing the interface and the client using it. A UDL file contains the complete connection string information, including the data source, userid, password, and any other information needed to logon to and fetch data.

Figure 1:
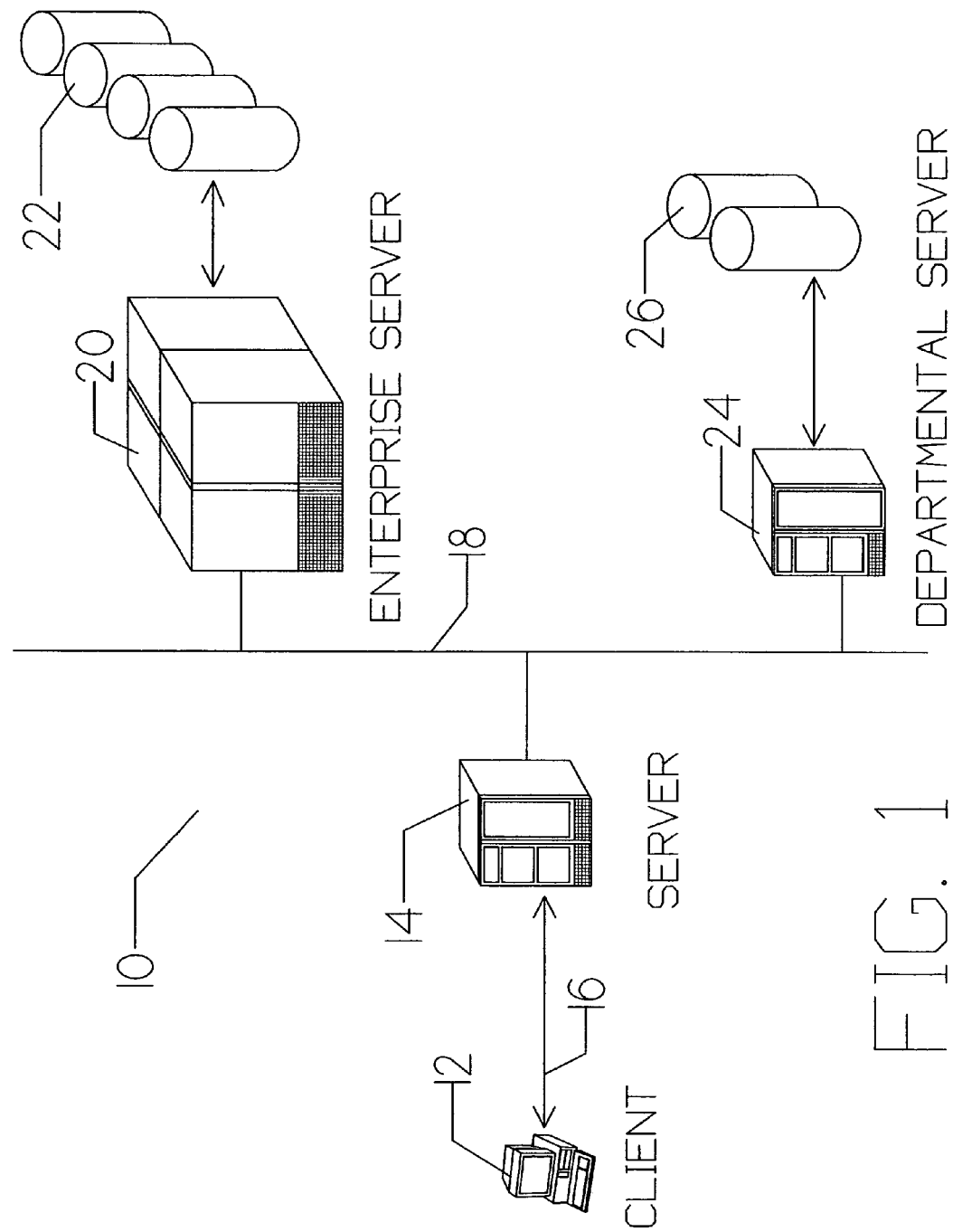
FIG. 1 is a pictographic view of the hardware of the preferred embodiment.

FIG. 1 is a pictorial diagram of hardware suite 10 of the preferred embodiment of the present invention. The client interfaces with the system via terminal 12. Preferably, terminal 12 is an industry compatible, personalized computer having a current version of the Windows operating system and suitable web browser, all being readily available commercial products. Terminal 12 communicates over network 16 using standardized HTML protocol, via Server 14. Network 16 may also be the Internet.

The BIS system is resident in Enterprise Server 20 and accompanying storage subsystem 22, which is coupled to Server 14 via WAN (Wide Area Network) 18. In the preferred mode, Server 14 is owned and operated by the enterprise owning and controlling the proprietary legacy data base management system. Server 14 functions as the Internet access provider for Internet terminal 12 wherein world wide web access 16 is typically a dial-up telephone line. This would ordinarily be the case if the shown client were an employee of the enterprise. On the other hand, server 14 may be a remote server site on the Internet if the shown client has a different Internet access provider. This would ordinarily occur if the shown client were a customer or guest.

In addition to being coupled to WAN 18, Enterprise Server 20, containing the BIS system, is coupled to departmental server 24 having departmental server storage facility 26. Additional departmental servers (not shown) may be similarly coupled. The enterprise data and enterprise data base management service functionality typically resides within enterprise server 20, departmental server 24, and any other departmental servers (not shown). Normal operation in accordance with the prior art would provide access to this data and data base management functionality.

In the preferred mode of the present invention, access to this data and data base management functionality is also provided to users (e.g., terminal 12) coupled to network 18. As explained below in more detail, server 14 provides this access utilizing the BIS system.

Figure 2:
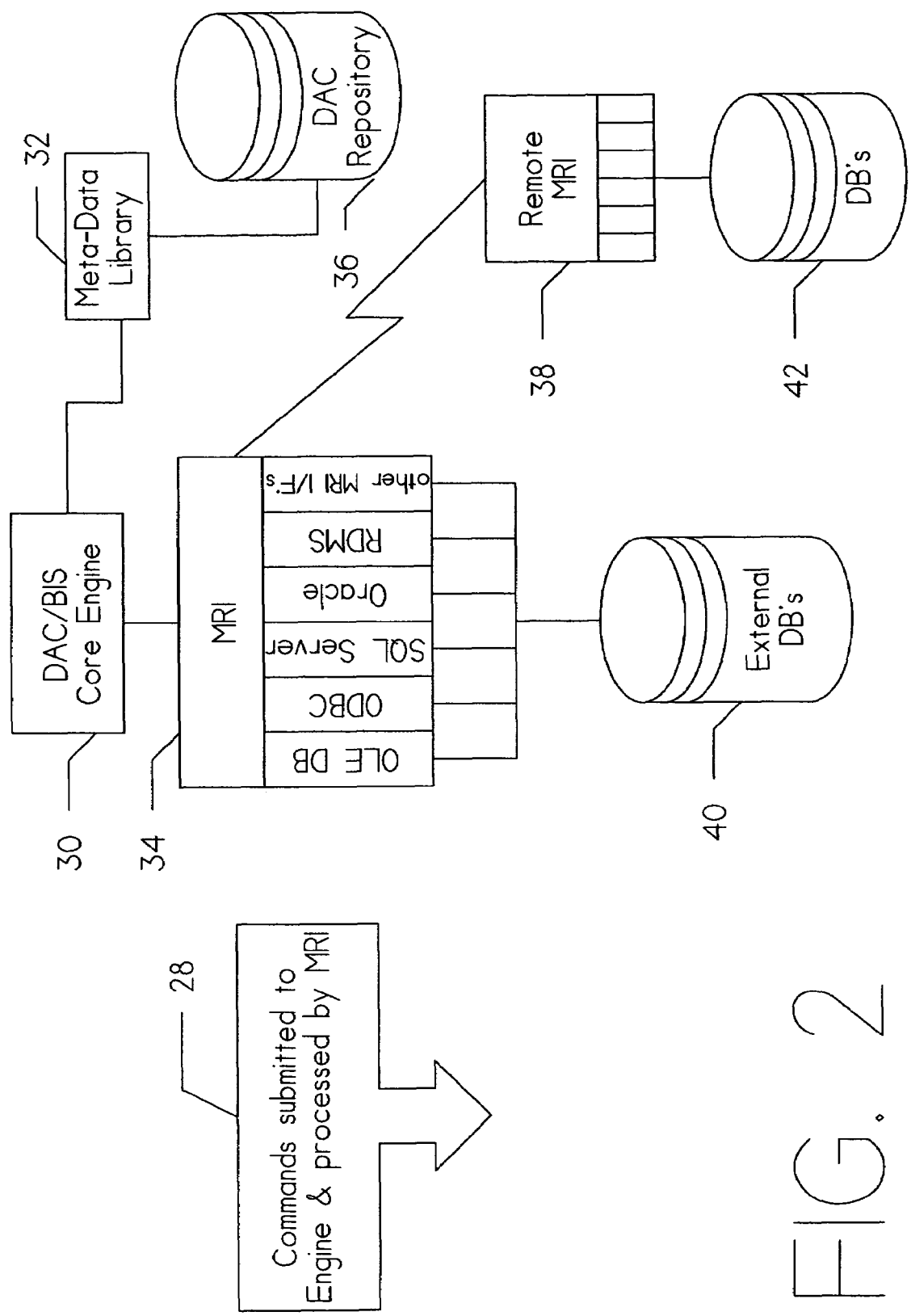
FIG. 2 is a pictorial diagram of the basic command process flow.

FIG. 2 is a functional diagram showing the major components of the @SPI (stored procedure interface) command process flow. This command is a part of the MRI (BIS Relational Interface) set of commands and combines many of the attributes of the previously existing @FCH (relational aggregate fetch) and @SQL (standard query language) commands. However, it is specifically targeted to executing stored procedures.

Command set 28 represents the commands defined for processing by MRI. In addition to @SPI, @FCH, and @SQL, @LGN (log on), MRI recognizes @LGF (log off), @DDI (data definition information), @RAM (relational aggregate modify), @TRC (trace relational syntax), @MQL (submit SQL syntax to a BIS data base) as the remaining commands. DAC/BIS core Engine 30 provides the basic logic for decode and execution of these commands. MRI 34 has relational access to data via the data base management formats shown to external data bases 40. In addition, MRI 34 can call upon remote MRI 38 to make similar relational access of remote data bases 42.

BIS core engine 30 executes commands utilizing meta-data library 32 and BIS repository 36. Meta-data library 32 contains information about the data within the data base(s). BIS repository 36 is utilized to store command language script and state information for use during command execution.

The @SPI command has the following basic format:

@SPI, c, d, lab, db, edsp?, action, wrap, vert 'sp-syntax', vpar1 . . . , vparN, typ1, . . . typN.

Fields c and d refer to the cabinet and drawer, respectively, which hold the result. The lab field contains a label to go to if the status in the vstat variable specifies other than normal completion. The required db field provides the data base name. The edsp? field specifies what is to be done with the result if an error occurs during execution.

The sub-field labeled action defines what action is to be performed. The options include execution, return of procedures lists, etc. The wrap sub-field indicates whether to truncate or wrap the results. The vert sub-field defines the format of the results. The name of the stored procedure is placed into the sp-syntax field. The vpar provides for up to 78 variables that correspond to stored procedure parameters. Finally, the typ field defines the type of each stored procedure parameter.

Figure 3:
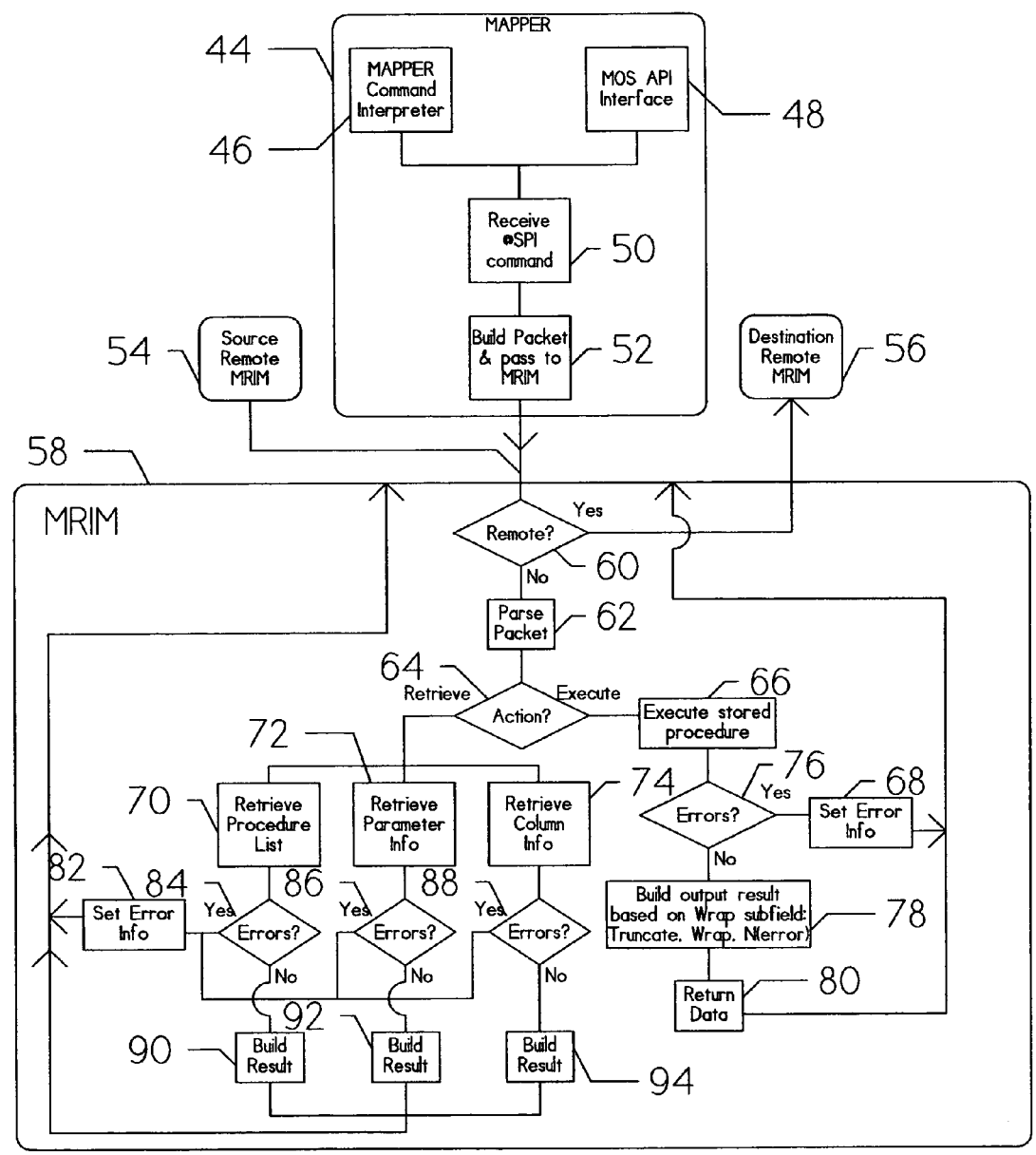
FIG. 3 is functional flow diagram for the basic command.

FIG. 3 is a high-level functional flow diagram for the command. The heart of the system is the BIS Relational Interface Module (MRIM) containing much of the logic for the preferred mode of the present invention. It is provided local data/commands from BIS 44 and remote data/commands from Source Remote MRIM 54. Remote results are forwarded via Destination Remote MRIM 56.

BIS 44 includes the BIS Command Interpreter and MOS API Interface 48 which provide the @SPI command to Receiver 50. The packet is built by element 52 for transfer to MRIM 58.

MRIM 58 receives remote packets from Source Remote MRIM 54. The @SPI command packet is received by element 60, whether local or remote. Remote packets are forwarded via Destination Remote MRIM 56. Local packets are passed to element 62 for parsing. Control is given to element 64 for switching between retrieve commands and execute commands.

Request packets for retrieval are routed to element 70, 72, or 74 depending upon whether it requests a list, parameter information, or column information, respectively. Upon the appropriate retrieval, elements 84, 86, and 88 look for a retrieval error. If yes, control is given to element 82 for setting the error information before exit. If not, control is given to element 90, 92, or 94 for building of the result packet, before exit.

Element 64 routes execution request packets to element 66 for execution of the stored procedure. Element 76 determines whether an error has occurred. If yes, element 68 sets the error information before exit. If not, element 78 builds the output results packet. Element 80 returns the data before exit.

Figure 4:
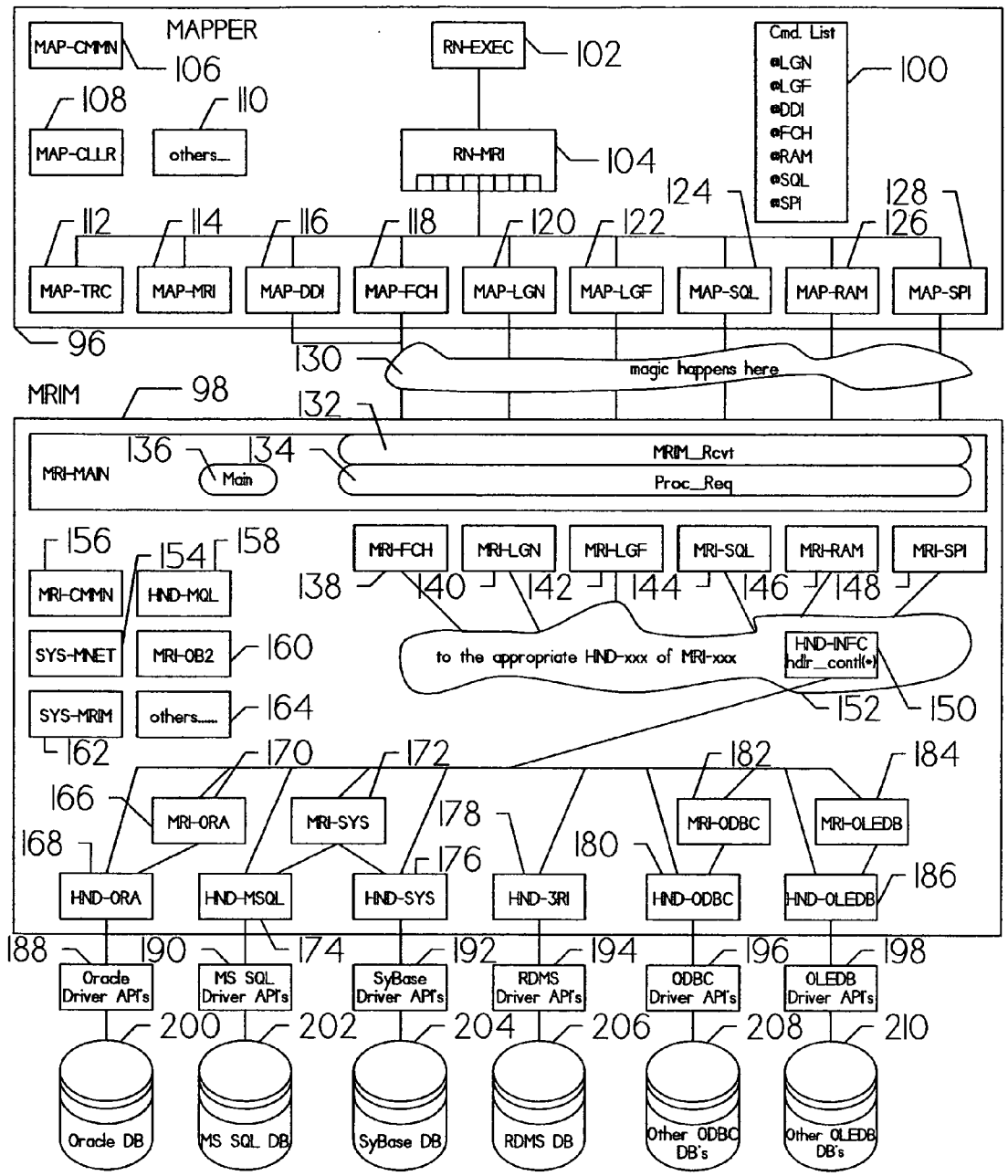
FIG. 4 is a schematic diagram showing the BIS and MRIM components.

FIG. 4 is a detailed block diagram showing the major components of BIS and MRIM as utilized in accordance with the preferred mode of the present invention. BIS 96 receives command packets as MAP-CMMN 106, MAP-CLLr 108, or others 110. Command List 100 specifies which of the commands are valid and to be executed. These are @LGN (log on), @LGF (log off), @DDI (data definition information), @FCH (relational aggregate fetch), @RAM (relational aggregate modify), @SQL (standard query language), and SPI (stored procedure interface). These commands are executed using RN-Exec 102, RN-MRI 104, and specialized elements 116, 118, 120, 122, 124, 126, and 128, whereas elements 112 and 114 handle @TRC (trace relational syntax) and information requests. Packets are prepared for all of the listed commands for transfer via interface 130 to MRIM 98.

Interface from BIS 96 to MRIM 98 is handled by MRI-Main 136. The incoming packets are routed via MRIM_Rcvr 132 and Proc_Req 134, as appropriate. Each of the listed commands (see list 100) is assigned to the corresponding one of the request handlers 138, 140, 142, 144, 146, and 148. After unpacking, switch 152, controlled by element 150, routes the information to the appropriate one(s) of the command handlers 166, 168, 170, 172, 174, 176, 178, 180, 182, 184, and 186. Data base command access is via the appropriate one(s) of the data base interfaces 188, 190, 192, 194, 196, and 198 to the specified one(s) of the available data bases 200, 202, 204, 206, 208, and 210. Internal utilities 154, 156, 158, 160, 162, and 164 assist in this process as needed.

Figure 5:
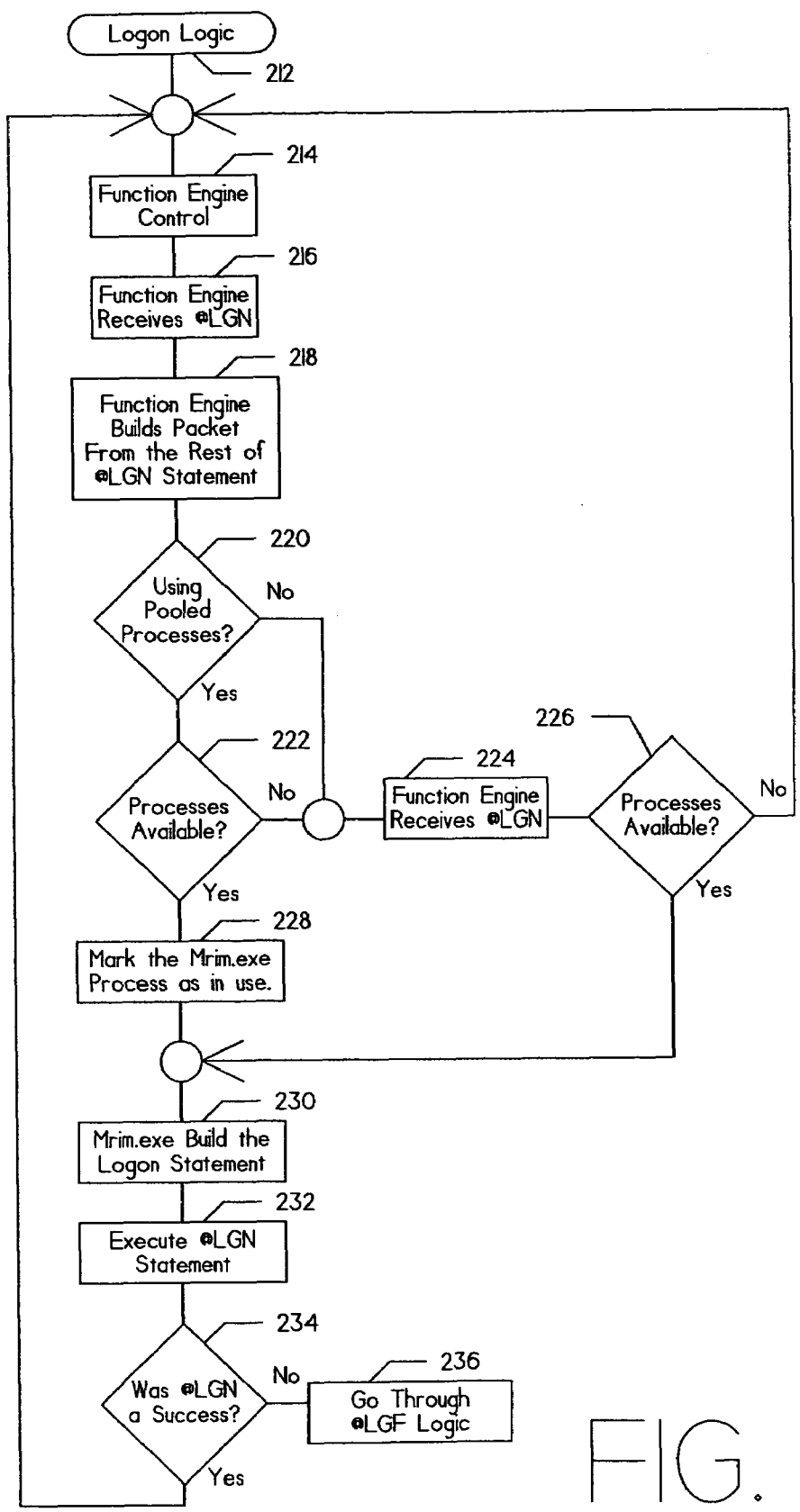
FIG. 5 is a detailed flow chart showing the operation of the OLEDB Log-On command.

FIG. 5 is a detailed flow chart showing operation of the Log-On command. Entry is via element 212. At element 214, the function engine control begins analysis of the received command. The @LGN command is identified at element 216. The information from the @LGN command is utilized to build a command packet at element 218. Element 220 determines whether a pooled process is involved. If no, control is given to element 224. If yes, element 222 determines whether the required processes are available. If not control is given to element 224. If available, control is given to element 228.

The @LGN command is provided to the function engine at element 224. If element 226 determines that the needed processes are not available, control is returned to element 214, with no further possible processing of the current command. If the processes are now available, element 226 provides command to element 230.

The Mrim.exe process is marked in use by element 228. At element 230 Mrim.exe builds the actual Log-On statement. This statement is executed at element 232 to perform the log-on function. Element 234 determines whether the execution was successful. If yes, control is returned to element 214 to await the next command. Otherwise control is given to element 236 to go through the @LGN logic.

Figure 6:
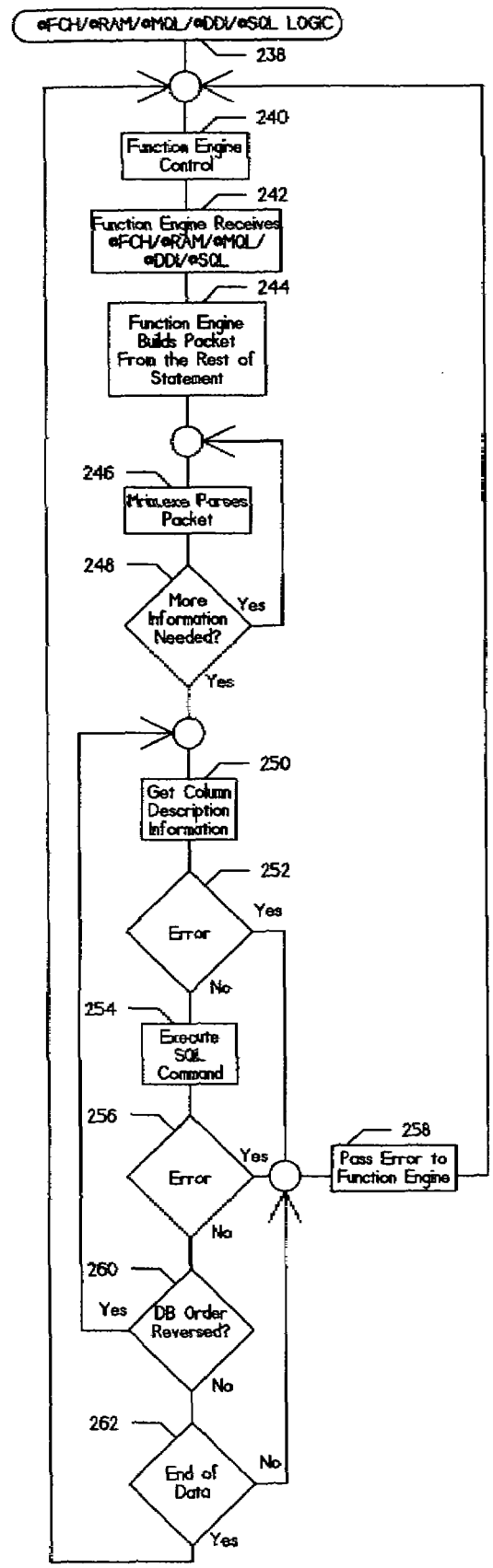
FIG. 6 is a detailed flow chart showing the operation of the OLEDB insert, update, delete, fetch commands.

FIG. 6 is a detailed flow chart of operation of the commands which operate upon the OLEDB data. Entry is via element 238. The function engine control is initiated at element 240. The function engine receives the transferred command at element 242. The available commands are: @FCH (fetch); @RAM (relational aggregate modify); @DDI (data definition information); and @SQL (standard query language).

At element 244, the function engine builds a packet from the command statement. MRIM.exe parses the packet at element 246. Element 248 determines whether more information is needed. If yes, control is returned to element 246 for further parsing. If not, control is given to element 250 for obtaining the column information. Element 252 determines whether an error has occurred. If yes, control is given to element 258. If not, element 254 executes the SQL command. If element 256 determines that an error has occurred during the execution, control is given to element 258 for passing the error to the function engine, with control returned to element 240 for the next command.

If no error has occurred in the execution, element 260 determines if the data base order has been reversed. If yes, control is given to element 250 for re-execution of the command. If not, element 262 determines whether all data has been processed. If not, an error has occurred and control is given to element 258 for error processing. If no error, the command has been fully executed properly, and control is returned to element 240 for processing of the next command.

Figure 7:
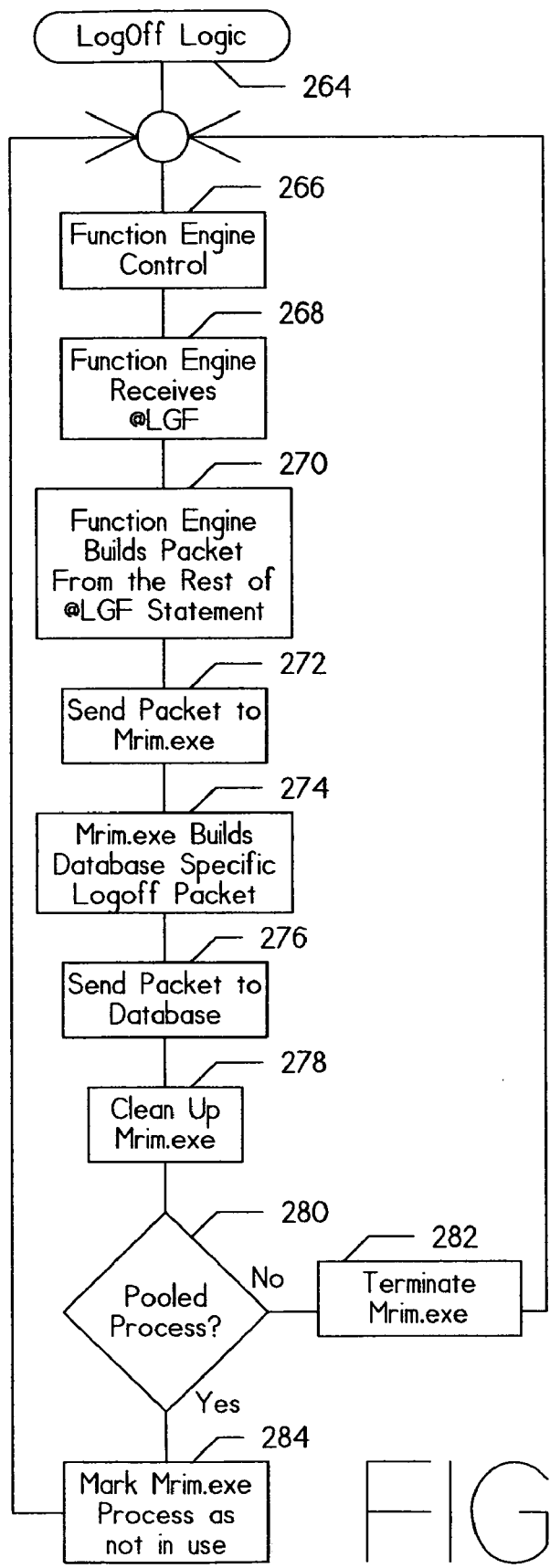
FIG. 7 is a detailed flow chart showing the operation of the OLEDB Log-Off command.

FIG. 7 is a detailed flow chart showing operation of the Log-Off command. Entry is via element 264. The function engine is initiated at element 266. The @LGF command is received at the function engine at element 268. The function engine builds a packet from the @LGF command at element 270.

The @LGF command packet is sent to Mrim.exe at element 272. Mrim.exe builds the data base specific log-off packet at element 274. Element 276 sends the packet to the appropriate data base. Mrim.exe is cleaned up at element 278.

Element 280 determines whether the command is a pooled process. If not, control is given to element 282 for termination of the process, and control is returned to element 266 for a future command. If it is a pooled process, element 280 gives control to element 284 to mark Mrim.exe as not in use. Control is returned to element 266 to await the next command.

Figure 8:
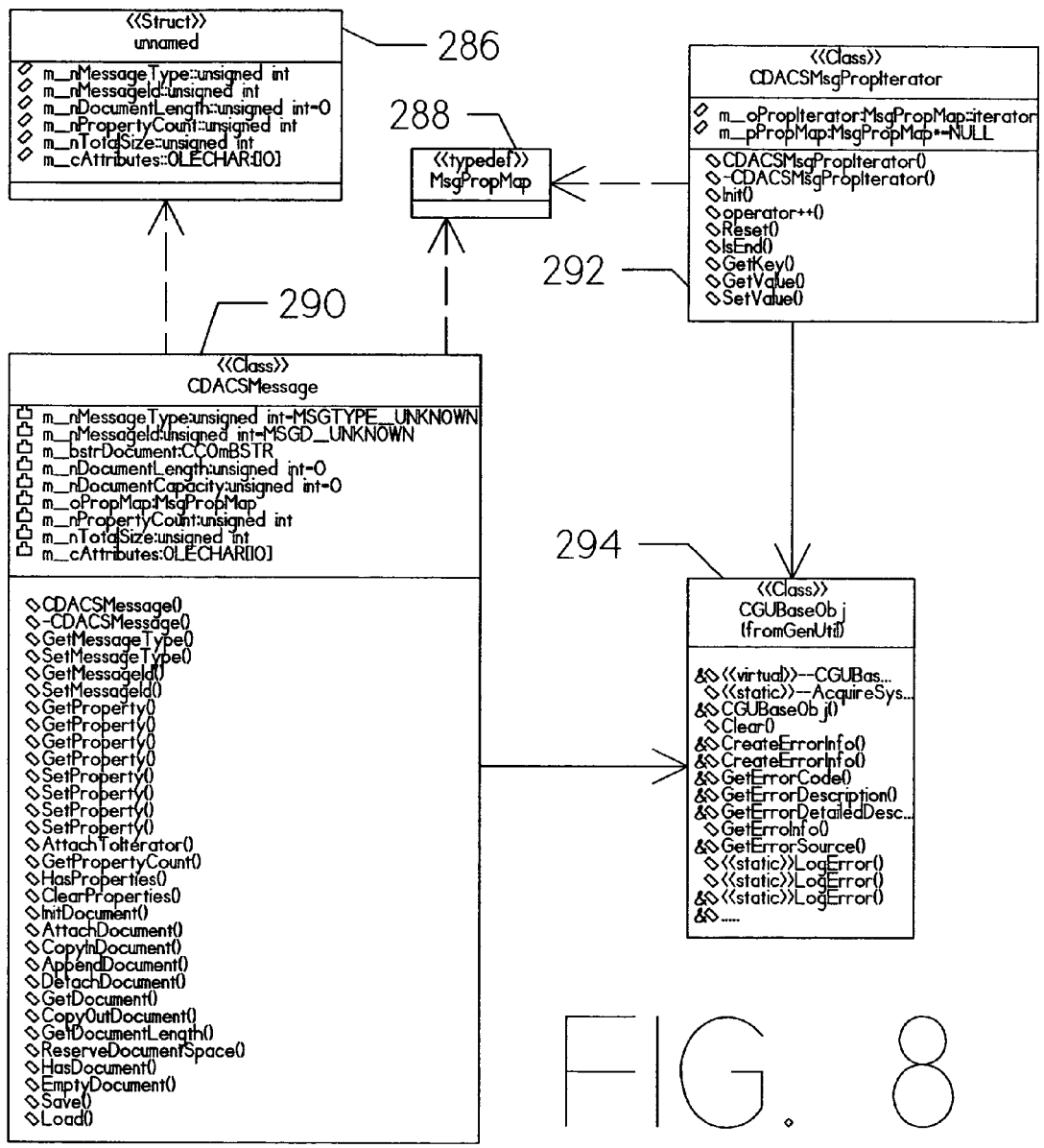
FIG. 8 is a detailed class diagram showing class definitions for the messaging protocol.

FIG. 8 is a detailed class diagram that describes the class definitions. Using the object model in the class diagram, a comsumer application can send a message to a peer application. Element 290 defines the CDACSMessge format. The individual variables are in turn defined by element 286. CDACSMsgPropIterators are defined in element 292, which along with the definitions of element 290 present element 288 with the message map. The object format is shown at element 294.

FIG. 9 is a detailed table showing the methods for managing the message body. In the preferred mode of the present invention, the CDACSMessage class provides methods for managing the message document similar to the CComBSTR methods for managing the attached BSTR. Some of the CDACSMessage methods have similar names and actions as CcomBSTR counterparts, except that they apply to the m_bstrDocument member rather than m_str.

In accordance with the table of FIG. 8, the left most column lists the basic functions. The corresponding entry within the right most column defines the operation associated therewith.

The CDACSMessage class does not provide methods corresponding to the CComBSTR methods ReadFromStream and WriteFromStream, to write the document to an IStream. Instead, it provides the Save and Load methods for converting between the entire object and a simple memory buffer. Furthermore, the CDACSMessage class does not provide methods corresponding to the CComBSTR method LoadString for loading a string from a resource.

FIG. 10 is a detailed table showing the methods utilized by CDACSMessage class to manage the property list. The left most column provides a listing of the defined operations. The right most column offers a complete definition corresponding to each of these operations.

FIG. 11 is a detailed sequence diagram showing use of the objects to build up the CDACS message by a message producer in order to convey a message payload to another application. Each of preliminary messages 1-5 is sequentially initiated by Message Producer 290 as shown. Table 300 provides a detailed description corresponding to each of these preliminary messages. The information is integrated at CDACS Message 298 into the CDACS transportable message 5.1, which is more fully defined in table 300.

Figure 12:
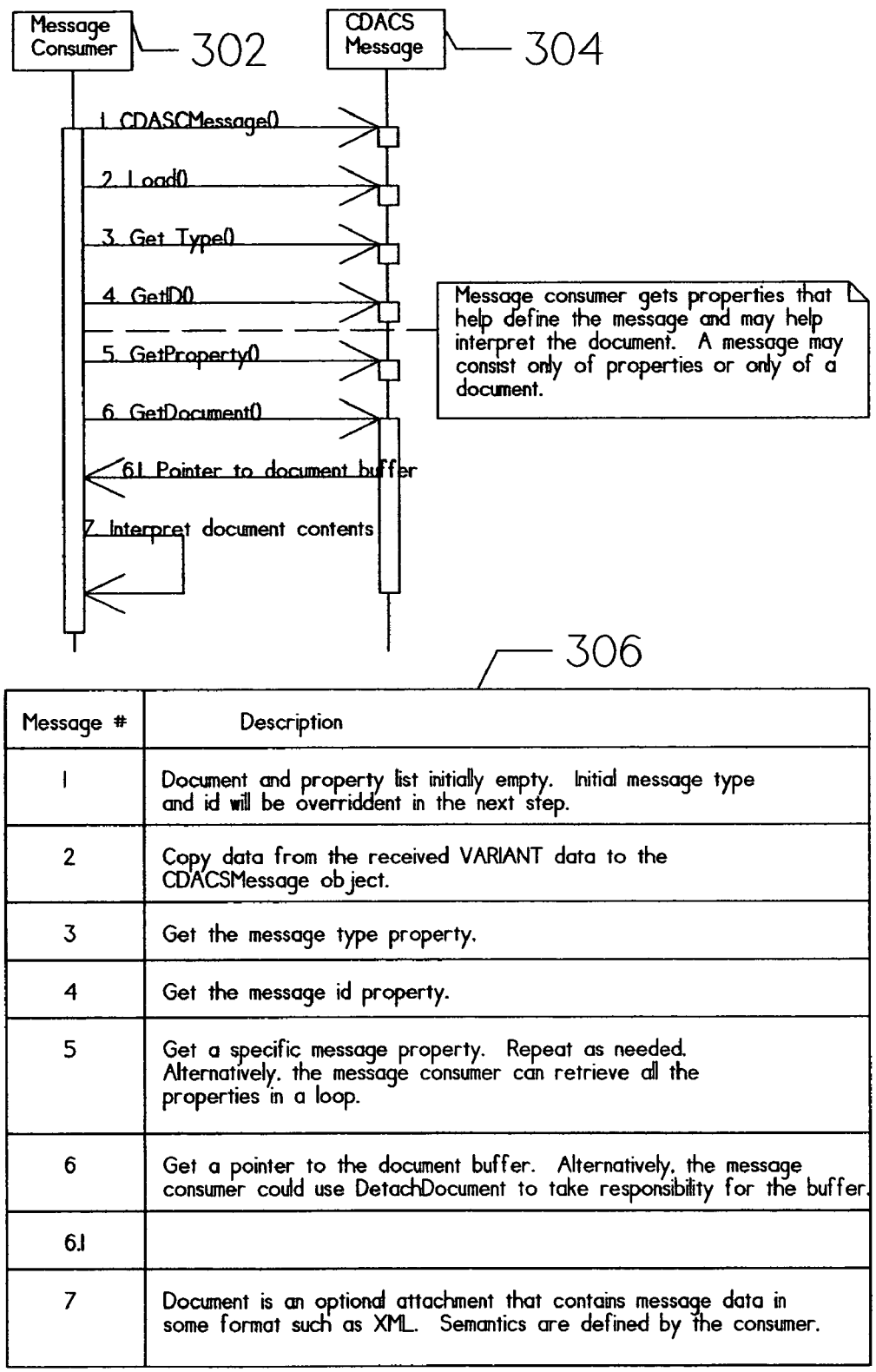
FIG. 12 is a detailed sequence diagram showing how a message consumer application utilizes the object model to retrieve information.

FIG. 12 is a detailed sequence diagram showing how a message consumer application uses the object model to retrieve the enclosed information. Internal messages 1-6 are sent from Message Consumer 302 to CDACS Message 304 as shown. Each of these is defined in detail in table 306. Internal message 6.1 provides the unpacked data to Message Consumer 302. Internal message 7 actually shows use of the unpacked data by Message Consumer 302 as defined in table 306.

Having thus described the preferred embodiments of the present invention, those of skill in the art will be readily able to adapt the teachings found herein to yet other embodiments within the scope of the claims hereto attached.

We claim:

1. A method of transferring data from a first application having a legacy data base located with a legacy data base management system with a first format to a second application located within said legacy data base management system employing a second format which is incompatible with said first format under control of a user terminal which provides a client with in interface to said legacy data base management system comprising:

a. determining said first format associated with said data from said legacy data base of said first application;
 b. ascertaining a location of said data within said legacy data base;
 c. packing an identifier of said first format and an identifier of said location within said legacy data base of said first application into a message having a predefined format;
 d. transferring said message from said first application to said second application via said legacy data base management system;
 e. unpacking said message to determine said first format and said location within said legacy data base of said first application; and
 f. accessing said data by said second application using said indication of said first format and said indication of said location within said legacy data base of said first application.

2. A method according to claim 1 wherein said data further comprises a plurality of data objects.

3. A method according to claim 2 wherein said predefined format further comprises Extended Markup Language.

4. A method according to claim 3 wherein said transferring step further comprises transferring via a publically accessible digital data communication network.

5. A method according to claim 4 wherein said publically accessible digital data communication network further comprises the Internet.

6. An apparatus having a plurality of computers providing data processing functions comprising:

a. a first application program located within a first computer and having a data base with a first format;
 b. a second application program located within a second computer and having a legacy data base with a second format which is incompatible with said first format responsively coupled to said first application program;
 c. a message having a preexisting format generated by said first application program for transfer to said second application program;
 d. a data object responsively coupled to said first application program having an indication of a location and having an indication of said second format; and
 e. wherein said message contains a definition of said location and said second format.

7. The apparatus of claim 6 further comprising a publically accessible digital data communication network wherein said first application program is responsively coupled to said second application program via said publically accessible digital data network.

8. The apparatus of claim 7 wherein said preexisting format further comprises Extended Markup Language.

9. The apparatus of claim 8 further comprising a user terminal which provides a client with in interface to said legacy data base management system containing said first application program.

10. The apparatus of claim 9 wherein said publically accessible digital data communication network further comprises the Internet.

11. An apparatus which provides communication between a first application program and a second application program comprising:

a. first application program, the first application program providing a user interface via a user terminal which permits a client to interface with a computer system;
 b. second application program, the second application program being responsively coupled to said first application program and offering a data processing service;

c. data object, the data object being responsively coupled to said first application program and having a location and a format; and d. a message generator, the message generator being responsively coupled to said first application program, the message generator further preparing a message having a preexisting format for transfer of said location and format of said data object means from said first application program to said second application program.

12. An apparatus according to claim 11 wherein said first application program further permits the generation of a second service request.

13. An apparatus according to claim 12 further comprising a publically accessible digital data communication network which responsively couples said first application program and said second application program.

14. An apparatus according to claim 13 wherein said publically accessible digital data communication network further comprises the Internet.

15. An apparatus according to claim 14 wherein said preexisting format further comprises Extended Markup Language.

16. A data processing system having a first application program located within a first computer and having a data base with a first format responsively coupled to a second application program located within a second computer and having a legacy data base with a second format comprising:

a. a data object having an indication of a location of said legacy data base within said second computer and an indication of said second format of said legacy data base;

b. a message having a preexisting format for transfer from said first application program to said second application program; and c. wherein said message contains said location of said legacy data base within said second computer and a definition of said second format.

17. The data processing system according to claim 16 further comprising a publically accessible digital data communication network which responsively couples said first application program to said second application program.

18. The data processing system according to claim 17 wherein said publically accessible digital data communication network further comprises the Internet.

19. The data processing system according to claim 18 further comprising a user terminal housing said first application program.

20. The data processing system according to claim 19 wherein said preexisting format further comprises Extended Markup Language.

21. An apparatus including a data processing system comprising:

a. a user terminal which provides a client with an interface to said data processing system having a first application program;

b. a second application program responsively coupled to said first application program via a publically accessible digital data network;

c. a message having a preexisting Extended Markup Language format generated by said first application program for transfer to said second application program;

d. a data object responsively coupled to said first application program having a location and having a second format which is incompatible with said preexisting Extended Markup Language; and e. wherein said message contains a definition of said location and said second format.

* * * * *